(12) United States Patent
Spivey et al.

(10) Patent No.: US 7,024,070 B2
(45) Date of Patent: Apr. 4, 2006

(54) ELECTRONIC FIBER OPTIC SWITCH WITH OPTICAL INTERCONNECT

(76) Inventors: Brett A. Spivey, 131 Seeman Dr., Encinitas, CA (US) 92024; Richard B. Holmes, 3357 Chasen Dr., Cameron Park, CA (US) 95682

( * ) Notice: Subject to any disclaimer, the term of this patent is extended or adjusted under 35 U.S.C. 154(b) by 773 days.

(21) Appl. No.: 09/976,857

(22) Filed: Oct. 12, 2001

(65) Prior Publication Data

US 2003/0228087 A1 Dec. 11, 2003

Related U.S. Application Data

(63) Continuation-in-part of application No. 09/716,196, filed on Nov. 17, 2000, now Pat. No. 6,313,936, and a continuation-in-part of application No. 09/666,898, filed on Sep. 20, 2000.

(51) Int. Cl.
*G02B 6/26* (2006.01)
*H04B 10/00* (2006.01)

(52) U.S. Cl. .............................. 385/17; 385/15; 385/16; 385/31; 385/33; 385/88; 385/89; 398/55; 398/56; 398/57; 398/111; 398/112; 398/113; 398/118; 398/130

(58) Field of Classification Search ................... 385/15, 385/16, 17, 18, 24, 53, 88, 89, 92, 139, 31, 385/33; 398/118, 50, 55, 56, 51, 57, 96, 111, 398/112, 113, 130
See application file for complete search history.

(56) References Cited

U.S. PATENT DOCUMENTS 4,979,138 A * 12/1990 Arrathoon .................. 708/191
5,532,855 A * 7/1996 Kato et al. .................. 398/55

(Continued)

OTHER PUBLICATIONS

Haney, et al; Description and Evaluation of the Fast–Net Smart Pixel Based Optical Interconnection Prototype, Proc of the IEEE, vol. 88, No. 6 Jun. 2000.

(Continued)

*Primary Examiner*—Brian Healy
(74) *Attorney, Agent, or Firm*—John R. Ross; John R. Ross, III

(57) ABSTRACT

A large fiber optic switch system with a free-space optical interconnection configuration. The switch system comprises a plurality of individual switch units, each individual switch unit having a plurality of electronic multi-switch switches each multi-switch switch being re-configurable upon command of a computer processor and having a plurality of electronic input ports and electronics output ports. A first portion of these input ports and a first portion of these output ports are connected directly or indirectly to incoming and outgoing communication lines. A second portion of the output ports is connected to an electronic driver unit that drives an optical emitter array. Each emitter in the emitter array produces a light beam for carrying an optical communication signal. A second portion of the input ports of each of the multi-switch switches is connected to a detector array comprising an array of optical detectors for detecting optical signals and converting the signals to electronic signals and an array of amplifiers for amplifying the signals. The switch comprises a free space optical interconnection configuration for directing each of the light beams which are produced by said emitters of each emitter array in each switch unit to one of the optical detectors in each of the detector arrays of the other switch units. In a preferred embodiment signals incoming into a port of the first portion of the input ports of a first switch unit may be switched by the multi-switch to an emitter in the first switch unit which emits a light beam which is directed at one of the optical detectors of another switch unit. An optical detector of the other switch unit produces an electronic signal corresponding to the optical communication signals and the electronic signal is directed by the multi-switch switch of the other switch unit to one of the output ports from which the signal proceeds to a corresponding outgoing communication lines. In a preferred embodiment the optical interconnection configuration includes a mirror configured to direct beams from each of the emitters to one of the optical detectors.

18 Claims, 20 Drawing Sheets

U.S. PATENT DOCUMENTS

| | | | |
|---|---|---|---|
| 5,576,873 A | * 11/1996 | Crossland et al. | 398/54 |
| 5,648,859 A | * 7/1997 | Hirabayashi et al. | 349/9 |
| 6,313,936 B1 | * 11/2001 | Holmes | 359/250 |
| 6,326,600 B1 | 12/2001 | Christensen et al. | 240/201.1 |
| 6,452,700 B1 | * 9/2002 | Mays, Jr. | 359/15 |
| 6,580,845 B1 | * 6/2003 | Holmes | 385/16 |
| 6,707,594 B1 | * 3/2004 | Holmes | 359/291 |

OTHER PUBLICATIONS

Christensen et al, Two Bounce Optical Arbitrary permutation network Applied Optics, vol. 37, No. 14, May 10, 1998.

* cited by examiner

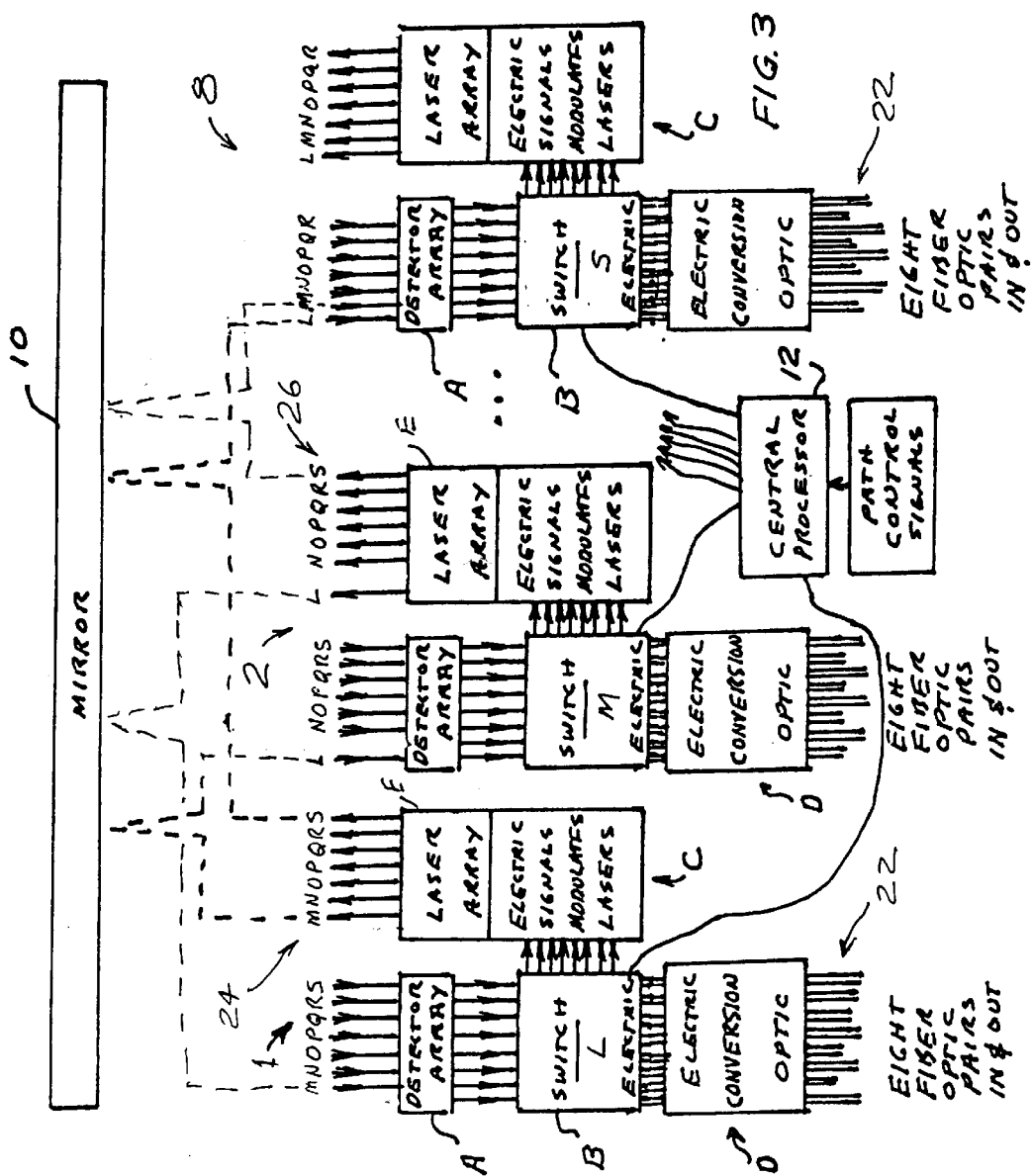

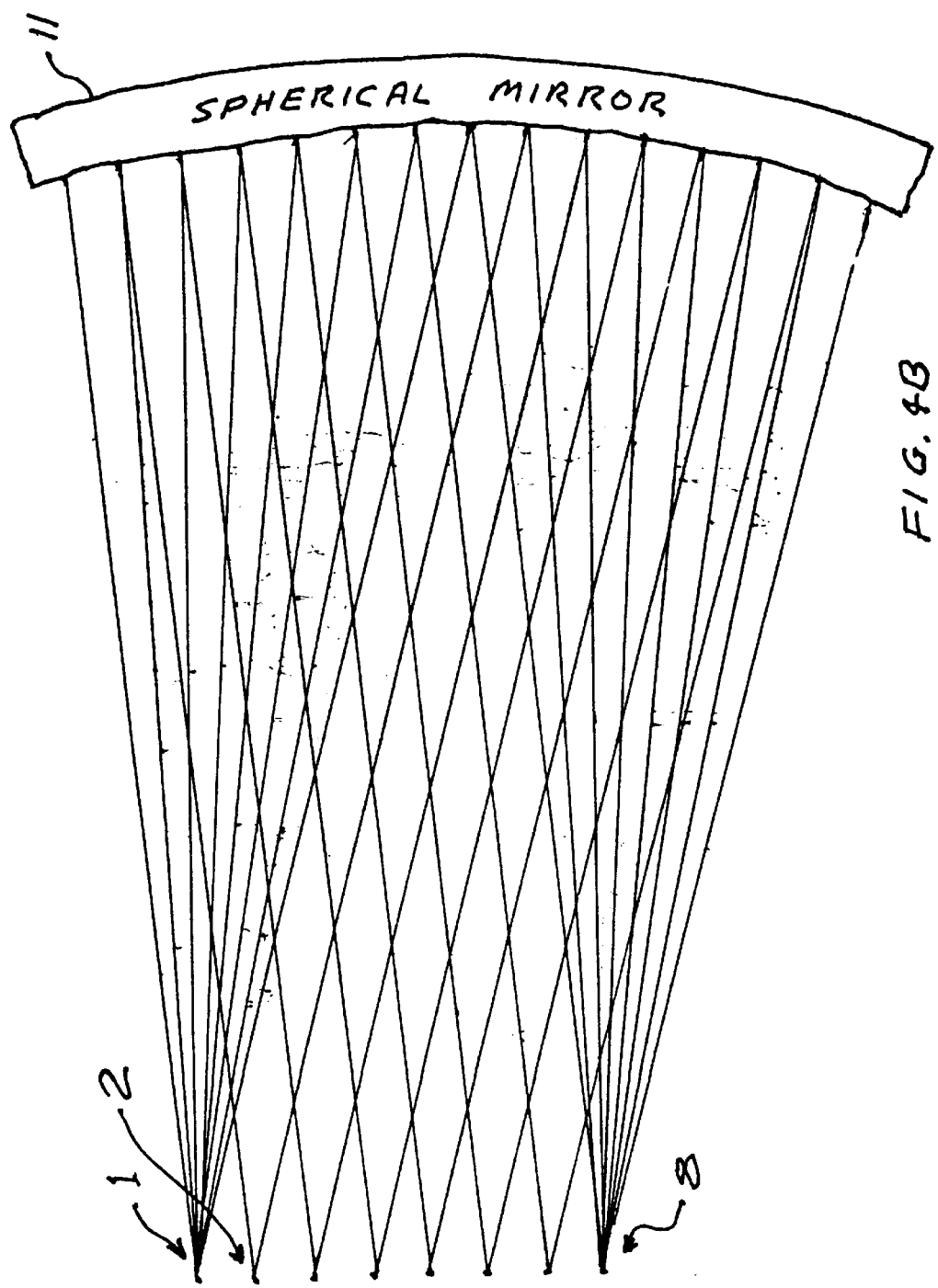

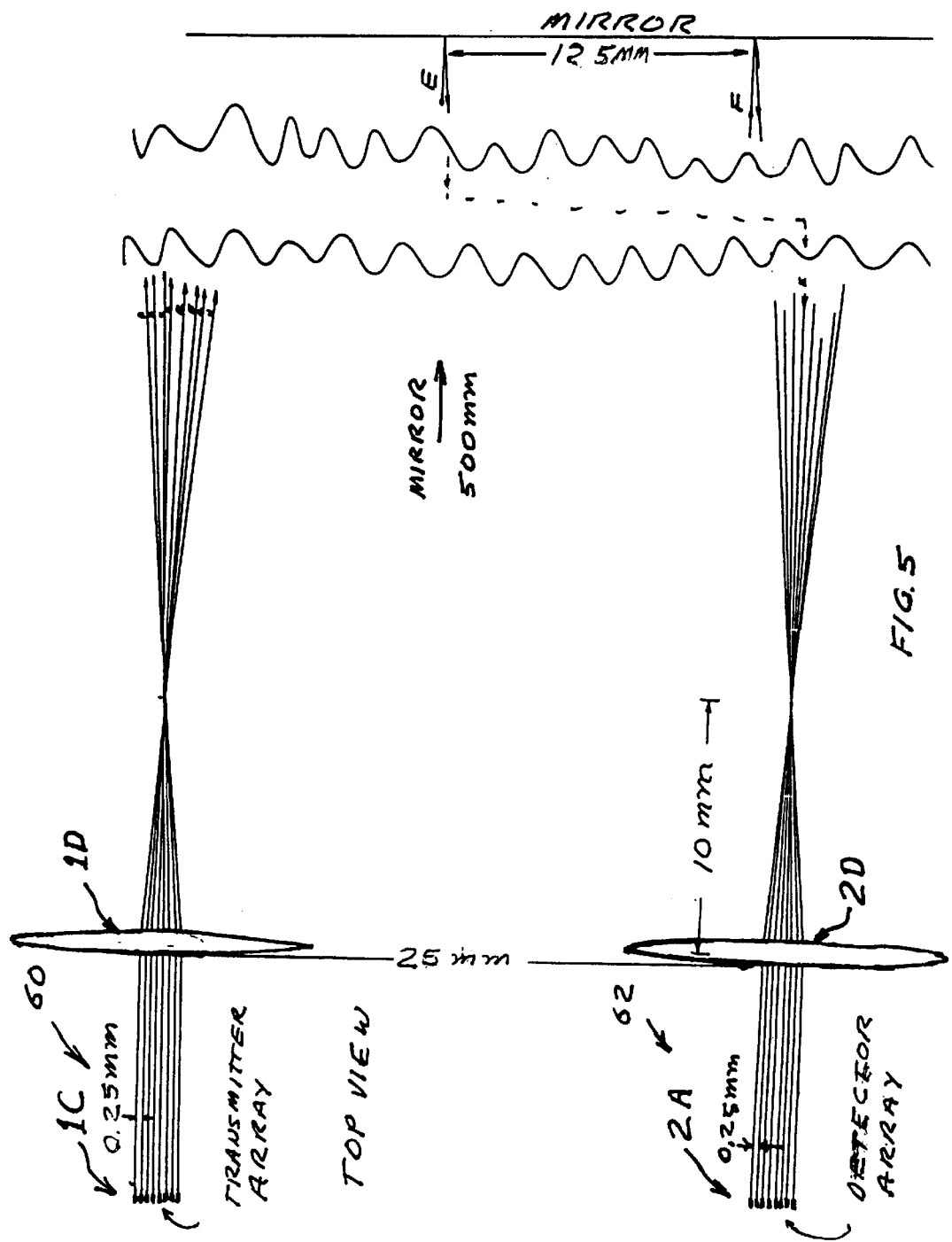

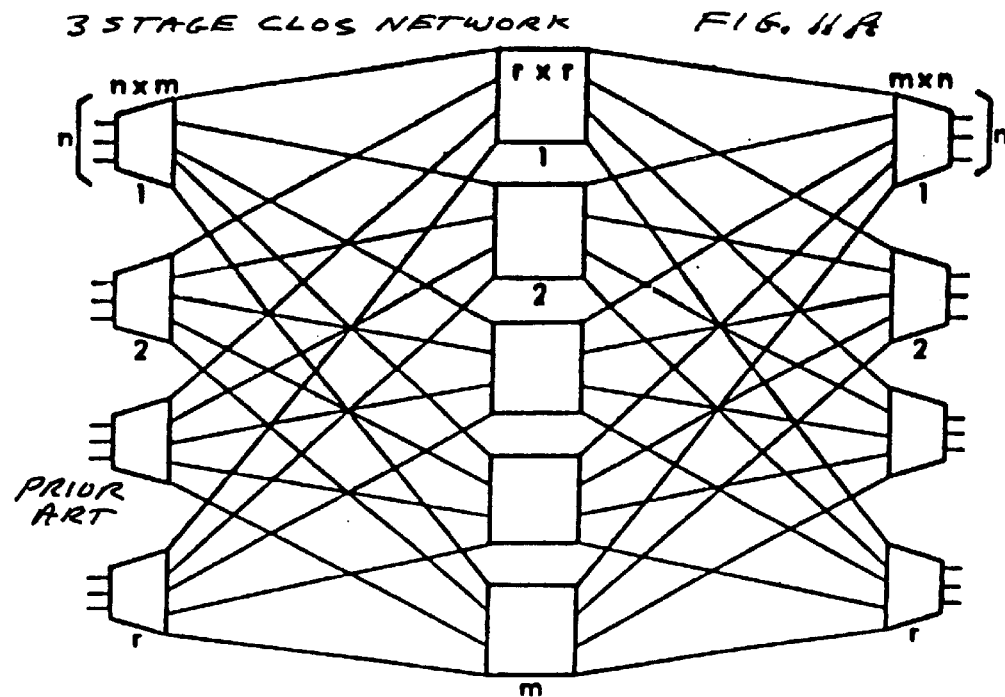
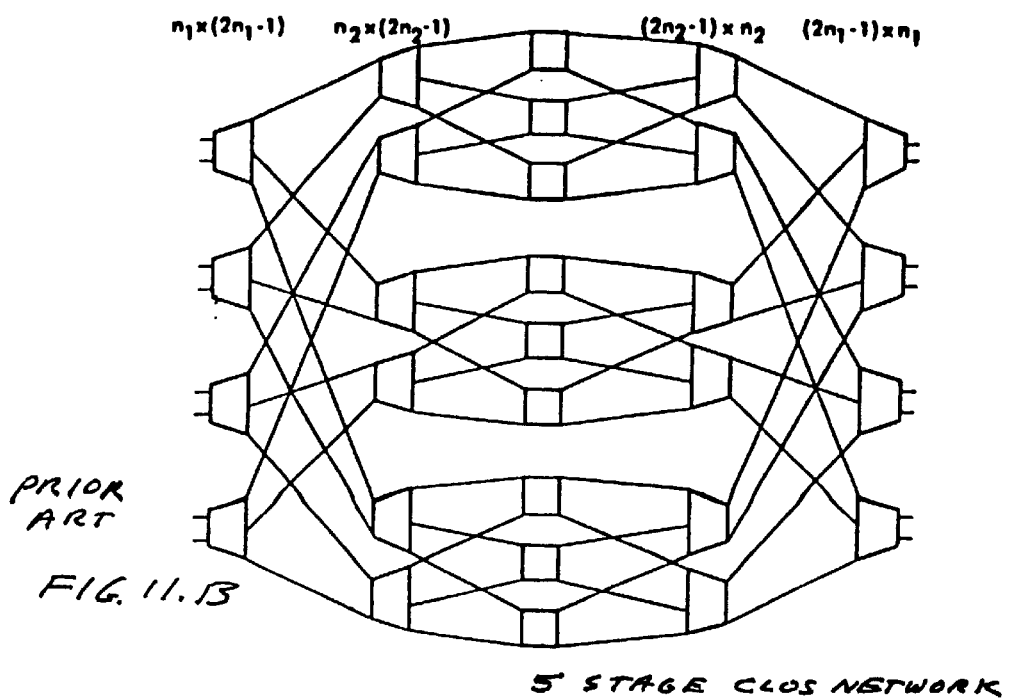

ELECTRONIC FIBER OPTIC SWITCH WITH OPTICAL INTERCONNECT

This application is a continuation-in-part application of U.S. patent applications, Ser. No. 09/716,196 filed Nov. 17, 2000, now U.S. Pat. No. 6,313,936, and 09/666,898 filed Sep. 20, 2000 both of which are incorporated by reference herein. This invention relates to switching of optical communication signals.

BACKGROUND OF THE INVENTION

Fiber Optics

Optical fiber transmission of information has played a key role in increasing the capability of communication system to transmit information. Optical fibers offer much higher bandwidths than copper cables and are less susceptible to various kinds of electromagnetic interference and other undesirable effects. As a result it is the preferred medium for transmission of data at anything more than a few tens of megabits per second over any distance more than a kilometer. There are in the United States more than 12 million fiber-miles of optical cable.

Switches

Communication networks including optical networks require several types of switches. These switches are distinguished by the time it takes them to operate. For, example one type is used for setting up light paths. These switches can operate relatively slowly such as 1 to 10 milliseconds. Protection switches are used to switch traffic streams in case a path fails or becomes overloaded. These switches must operate at speeds of 1 to 10 microseconds. A third application is packet switching. Here the switch must be able to operate in the length of time it takes for the packet to pass through the switch. For example a 53-byte packet at 10 Gb/s is 42 ns long so switching time for these switches should be just a few nanoseconds.

High Speed Electronic Switches

High-speed electronic switches are used extensively in fiber optic networks. For example, FIGS. 1A and 1B is a functional description of a 5×5 cross point switch. These switches typically consist of two sets of parallel conductors crossing each other at right angles as shown in the figures. A processor-controlled micro-switch is located at each of the 25 conductor intersection so that any single input line can be connected to any single output line by electronically closing the switch at the intersection of the two lines. Switches of this general type are referred to herein as "multi-switch switches". These switches are typically very fast and can switch to a new configuration in a few nanoseconds. These switches are available off-the-shelf from suppliers such as AMCC, Mindspeed, and Velio. In terms of available switching function, there are two types of switches: blocking and non-blocking. A switch is said to be non-blocking if any unused input port can be connected to any unused output port, regardless of the connectivity of the other ports. Thus, a non-blocking switch is capable of realizing every possible interconnection pattern between inputs and outputs.

64×64 Switch

An example of an existing off-the-shelf non-blocking high speed multi-switch electronic switch is a 17×17 non-blocking cross point switch is AMCC Model S2018 available from Applied Micro Circuits Corporation. This switch contains 17 input ports and 17 output ports and 17×17, or 289, micro-switches that are opened or closed on command from a computer processor. This device can switch at rates of less than about 2 to 3 ns and may be used for wavelength division multiplexing, Internet switching, digital video and fiber-optic data distribution. A 64×64 switch may be made by combining eight 17×17 cross point switches. FIG. 2 shows such a technique for utilizing the Model S2018 switch to provide a large switch 40 for 64 fiber-optic lines. Eight of the input ports and eight of the output ports of each of the eight switches 62 are used to connect the 64 pairs (incoming and outgoing) communication lines through eight optic to electric converter arrays 42. The large switch configuration requires that an output port of each of the cross point switches connect to an input port of each of the other seven cross point switches. This is typically done with a copper connection typically with loose wire, with some sort of printed circuit configuration or with fiber optics. Making these connections can be difficult since the connections must cross over each other as demonstrated in the FIG. 2 drawing. For example, in the FIG. 2 drawing there are 56 connecting wires. In larger switch configurations making the connections becomes much more difficult.

What is needed is a better technique, both equipment and method, for providing large fiber optic switches.

SUMMARY OF THE INVENTION

The present invention provides a large fiber optic switch system with a free-space optical interconnection configuration. The switch system comprises a plurality of individual switch units, each individual switch unit having a plurality of electronic multi-switch switches each multi-switch switch being re-configurable upon command of a computer processor and having a plurality of electronic input ports and electronics output ports. A first portion of these input ports and a first portion of these output ports are connected directly or indirectly to incoming and outgoing communication lines. A second portion of the output ports is connected to an electronic driver unit that drives an optical emitter array. Each emitter in the emitter array produces a light beam for carrying an optical communication signal. A second portion of the input ports of each of the multi-switch switches is connected to a detector array comprising an array of optical detectors for detecting optical signals and converting the signals to electronic signals and an array of amplifiers for amplifying the signals. The switch comprises a free space optical interconnection configuration for directing each of the light beams which are produced by said emitters of each emitter array in each switch unit to one of the optical detectors in each of the detector arrays of the other switch units. In a preferred embodiment signals incoming into a port of the first portion of the input ports of a first switch unit may be switched by the multi-switch to an emitter in the first switch unit which emits a light beam which is directed at one of the optical detectors of another switch unit. An optical detector of the other switch unit produces an electronic signal corresponding to the optical communication signals and the electronic signal is directed by the multi-switch switch of the other switch unit to one of the output ports from which the signal proceeds to a corresponding outgoing communication lines. In a preferred embodiment the optical interconnection configuration includes a mirror configured to direct beams from each of the emitters to one of the optical detectors. A preferred embodiment is comprised of eight individual switch units. In this preferred embodiment each of these eight individual switch units comprises a cross point switch, an emitter array with eight optical emitters and a detector array with eight optical detectors and eight input and eight output communication lines for a total of 64 pairs of communication lines. The optical interconnection configuration is configured such that a beam from one emitter in each emitter array is directed to reflect from the mirror to a detector in each of the other seven individual switch units. In this embodiment one emitter in each emitter array is not used, and one detector in each detector array is not used. The cross point switch in each individual switch unit is non-blocking switch and a computer processor controls each cross point switch so that any of the 64 communication lines can be connected with any other of the communication lines.

BRIEF DESCRIPTION OF THE DRAWINGS

FIG. 3 is a block diagram describing a preferred embodiment of the present invention.

FIGS. 4A and 4B are top views of drawings showing a preferred configurations for providing an optical communication link between the eight output ports of two of eight cross point switches in each case to an input port of each of seven other cross point switches. FIG. 4A uses a flat mirror and FIG. 4B uses a spherical mirror.

FIG. 5 is a top view drawing showing enlarged portions of the FIG. 2 configuration.

FIGS. 8A–8H demonstrate 22 connections made by a first preferred embodiment of the present invention.

FIGS. 11A and 11B show a 3-stage Clos network and a 5-stage Clos network.

DETAILED DESCRIPTION OF PREFERRED EMBODIMENTS

Preferred embodiments of the present invention can be described by reference to the drawings.

64×64 Large Nonblocking Switch

A first preferred embodiment of the present invention is shown in FIG. 3. In this embodiment a 64×64 switch 20 is provided to permit communication among 64 pairs of fiber optic communication lines. Eight pairs of fiber optic lines 22 are connected to each of the eight switch units 1 through 8. Each of the eight units comprises a 17×17 off-the-shelf electronic cross point switch B. A preferred model of cross point switch for this application is the AMCC Model S2018 switch described in the Background section.

Eight optical to electronic conversion arrays D are provided to convert optical signals transmitted through the fiber optic lines into electronic signals which can be switched by the electronic cross point switches and to convert the switched electronic signals back to optical signals after the switching is complete. These electronic conversion arrays are available off-the-shelf from many suppliers such as Fermionics and Emcore for detectors and JDSU, Cielo, Honeywell and Emcore for emitters.

Figure 2:
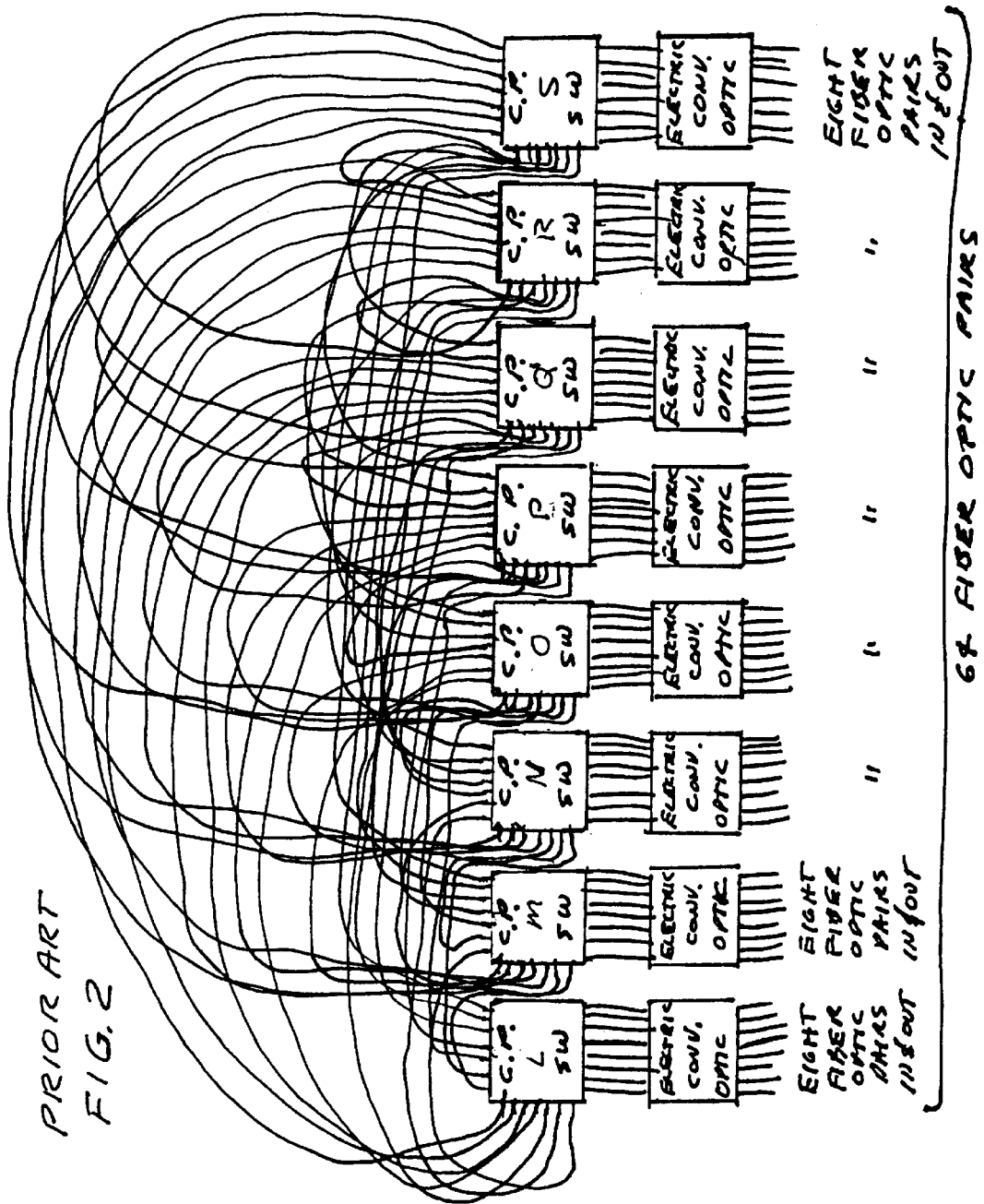
FIG. 2 demonstrates a difficulty in making electrical connections in a large electronic switch configuration.
Figure 2A:
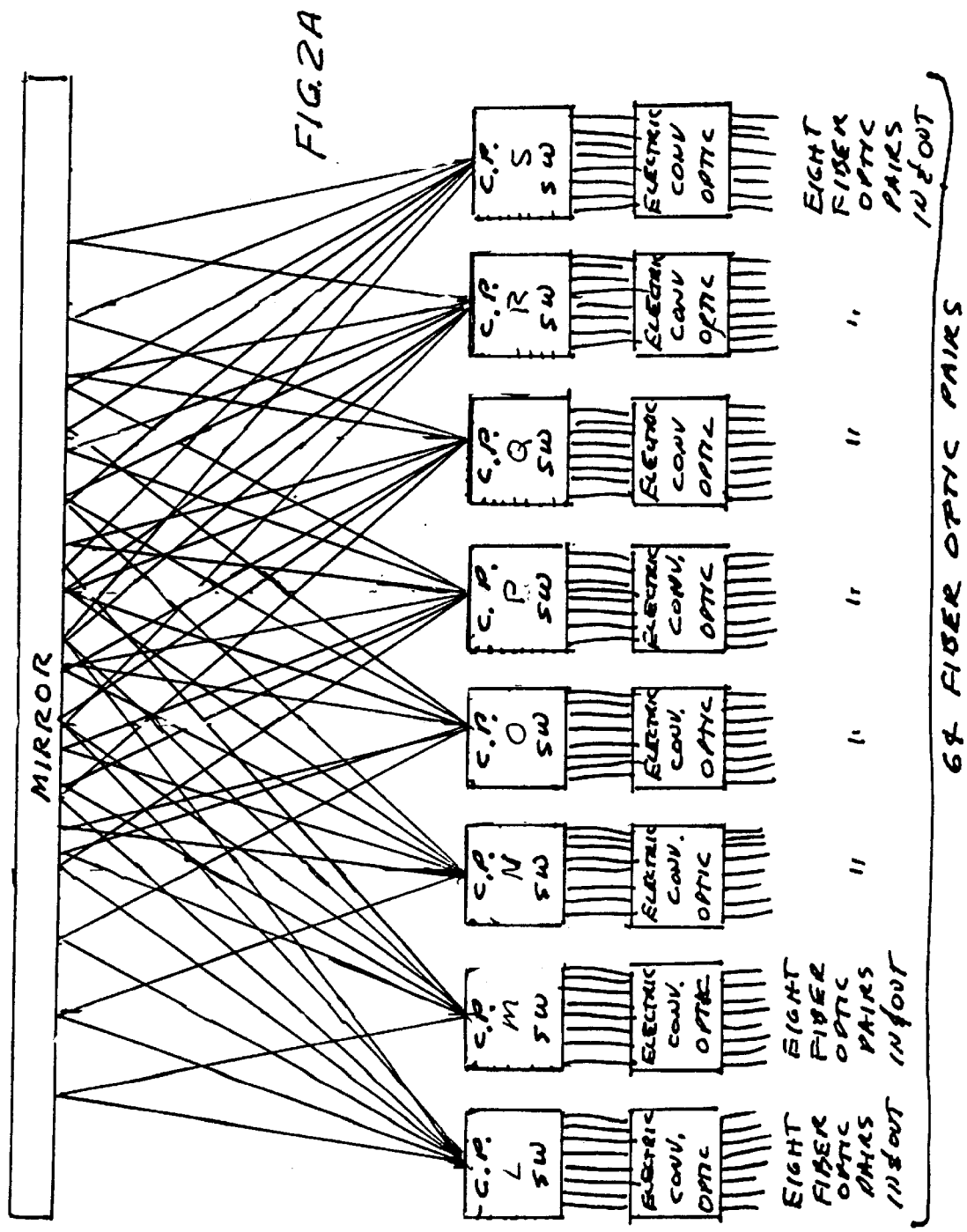
FIG. 2A shows how the connections made by the FIG. 8 configuration are made using a preferred embodiment of the present invention.

In this embodiment of the present invention as in the prior art example shown in FIG. 2 any of the 64 input ports of the cross point switches may be connected to any other of the 64 output ports of the eight cross point switches. However, in the present invention the connection between cross point switches is made optically through free space without any type of mechanical connection. Each of seven electronic output ports of each cross point switch is connected to one of seven drivers in driver array unit C which in turn provides drive power for one of seven lasers in laser array unit E. Each laser in each of the laser arrays E produces a laser beam for carrying a signal of one of the input fiber optic lines. Each of the seven laser beams in a particular switch unit is directed via an optical path Which includes a reflection off mirror 10 to a single detector in a detector array in different one of the eight switch units. For example, lasers M through S in laser array 1E as shown at 24 in FIG. 3 are configured to transmit their beams to detectors L in each of the other seven detector arrays, 2A through 8A. And lasers L, N through S in laser array 2E are configured to transmit their beams to detectors M is each of the seven detector arrays 1A, 3A through 8A as shown at 26 in FIG. 3. This way each one of the seven particular laser emitters from each of the eight switch unit communicates with a separate one of the seven detectors in each of the other seven switch units to provide unique optical connections similar to the electrical connections shown in FIG. 2.

Free Space Optical Interconnect

Figure 4A:
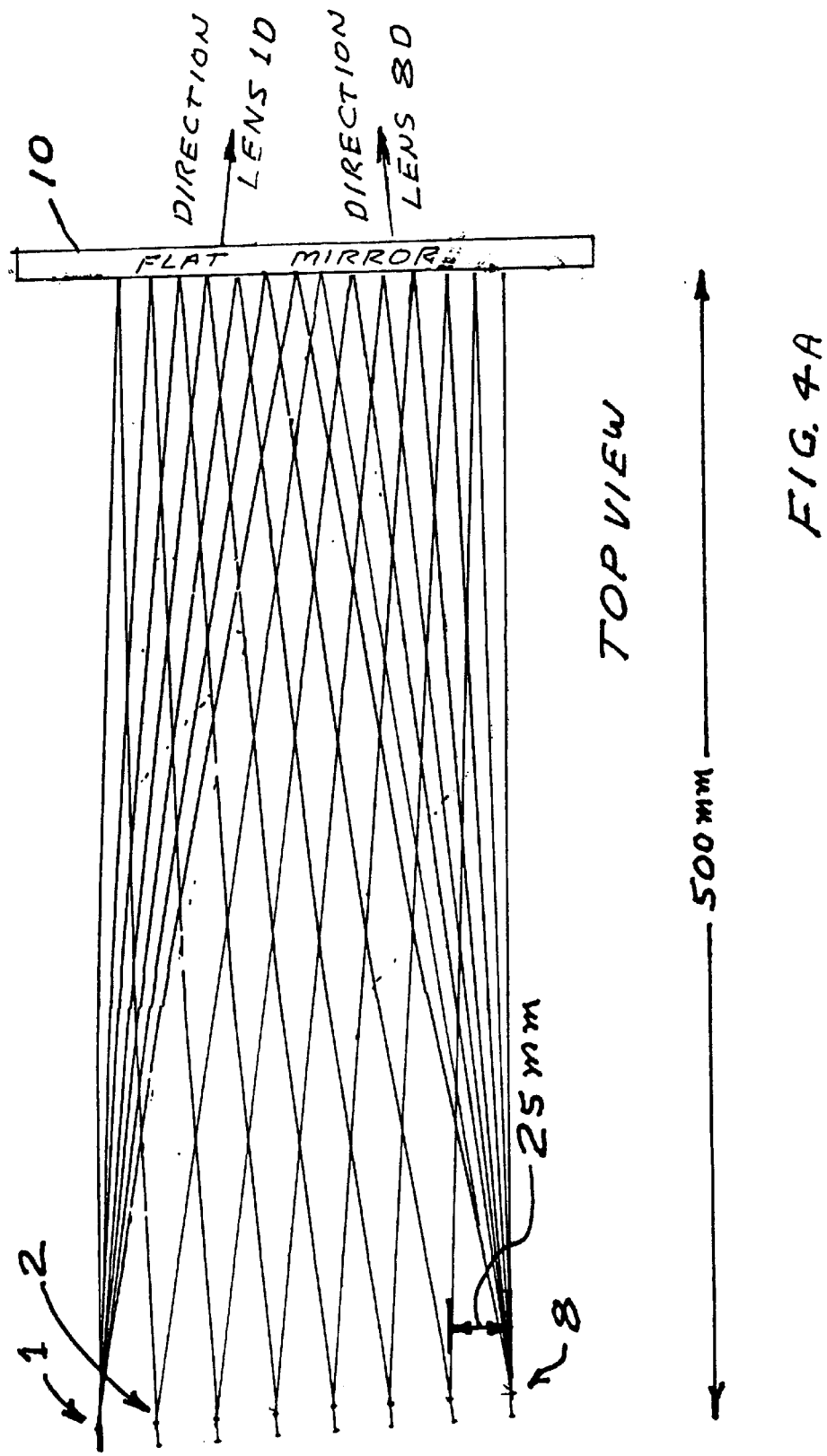

The free space optical interconnect of this preferred embodiment can be described by reference to FIGS. 4, 5 and 6A through 6D. In this preferred embodiment the laser transmitter arrays have the laser transmitters at a 0.25-mm pitch as shown at 60 in FIG. 5. The detectors are also on a 0.25-mm pitch as shown at 62 in FIG. 5. The detector arrays are positioned 25 mm below the transmitter arrays in each switch unit. The transmitter arrays and detector arrays of the individual switch units are separated by 25 mm as shown in FIG. 4A and FIG. 5.

Each transmitter array E is placed at a focal point of a 10-mm focal length lens ID through 8D. The beams out of the lens have an angular separation of 25 mrad, and so after a 1 m path, are separated by 25 mm. The optical switches are separated by 25 mm, so that one beam goes into each detector aperture. Since the detector arrays for each switch unit is positioned 25 mm directly below the emitter array of the same switch unit, the beams from the emitter arrays are angled down by 25 mrad so that central axis of each return beam hits the optical switch 25 mm below the transmitter aperture, which is the location of the detector aperture. The detectors are symmetrical with the transmitters. In each detector array there is an array of 8 receivers, separated by 0.25 mm, which also uses a lens with 10-mm focal length as shown in FIG. 5. In this preferred embodiment one laser and one detector is inoperative in each laser array and detector array. This is because connections internal to each cross point switch are made without resort to the optical portion of the switch unit. Examples of these internal connections (i.e., Connections 1, 5, 15, 16, 17, 18 and 22) are described below.

Tolerances

Figure 6A:
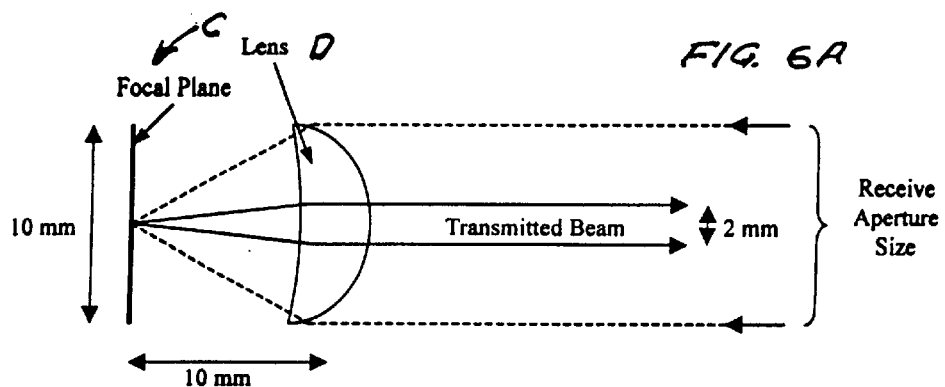
FIGS. 6A through 6D demonstrate how the optics are arranged in the above configuration to assure that the communication paths are adequate.

In order to calculate tolerances, the beam size must be calculated. The laser will typically not fill the lens and in fact will come out with an angle corresponding to an f# of 5. For 10-mm focal length, the beam size will thus be 2 mm. The reader will note that defraction of a 2 mm beam over 1000 mm is less than 1 mm, so if the beam is slightly focused, it will slightly decrease in size. The alignment tolerances can therefore be estimated by considering a 2-mm beam traveling 1 m going into a 10-mm aperture. Also important is the detector size, which we assume to be a typical 0.05-mm detector. The configuration is shown in FIG. 6A.

Figure 6B:
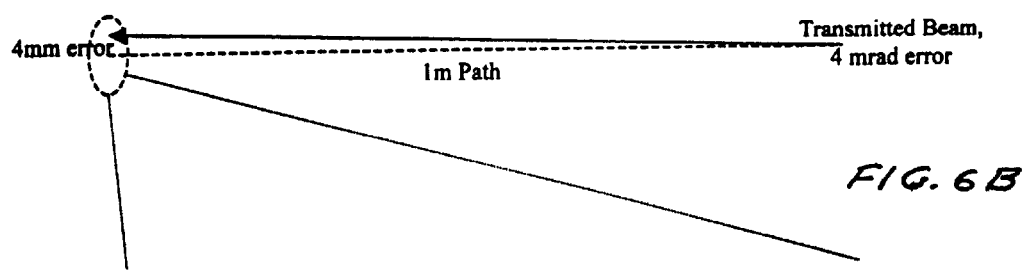
Figure 6C:
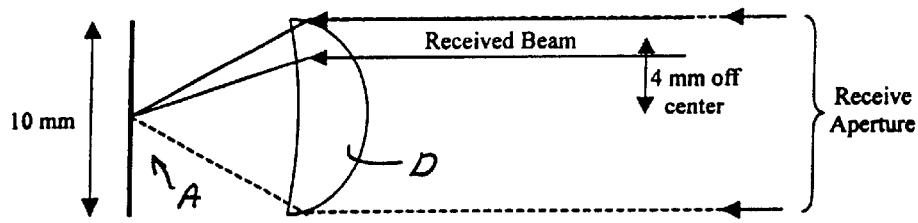
Figure 6D:
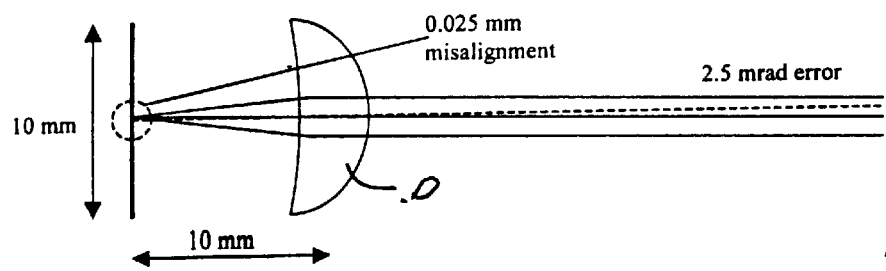

The angular alignment must first put the beam into the aperture. This requires an error of less than +/−4 mm over 1000 mm, or +/−4 mrad as shown in FIG. 6B and 6C in order for the 2 mm beam to stay completely within the 10 mm lens aperture. Next we must put the beam into the detector. This requires an error of +/−0.025-mm over 10 mm, or +/−2.5 mrad as shown in FIG. 6D. Both of these alignment values are very easy to achieve.

Positional tolerances are first lens to laser/detector, which is given by multiplying these alignment numbers by the lens focal length, so must be on the order of +/−0.025 mm or less. This in not a difficult tolerance, but is probably the most stressing of all of our requirements. Lens-to-lens placement is only required to an accuracy of +/−4 mm. The reader should note that these errors can add up, so in general we would like any given error to be smaller than the limits discussed above. A good rule of thumb would be to have errors ⅕ of the maximum in most cases, and a high as ½ of the maximum for one or two difficult spots. Alignment using the flat mirror is achieved by adjustment of the lenses. FIG. 4A indicates how the lenses should be adjusted to achieve the desired optical connections.

Figure 7:
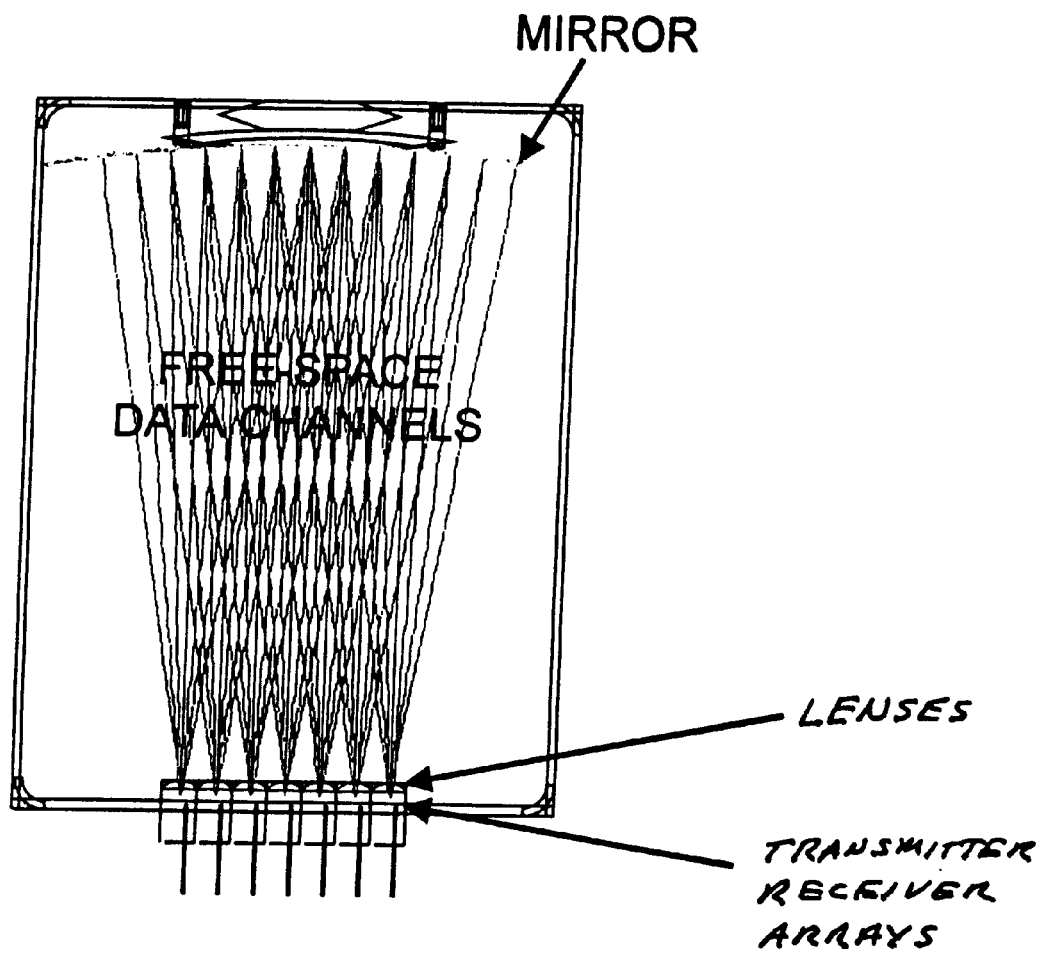
FIG. 7 is a drawing showing how a curved mirror can be used to simplify alignment.
Figure 8A:
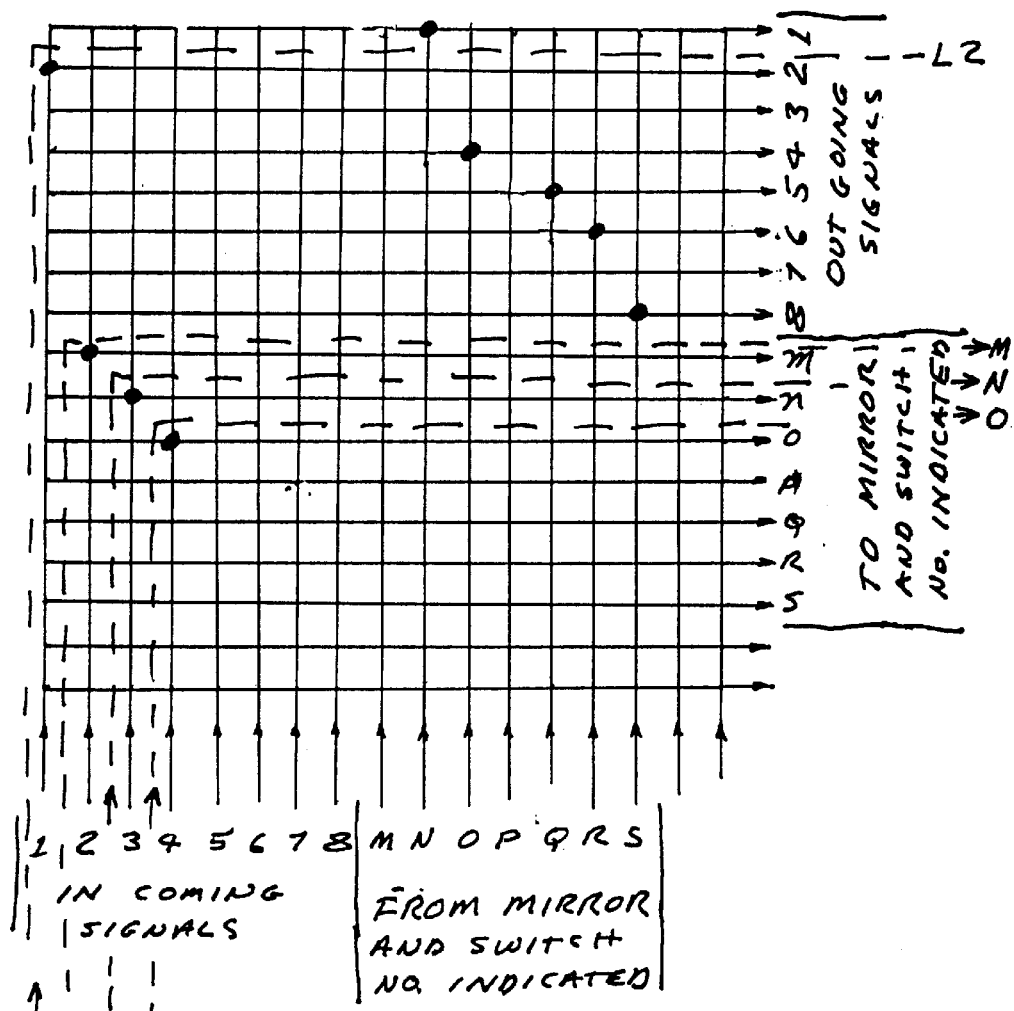
Figure 8B:
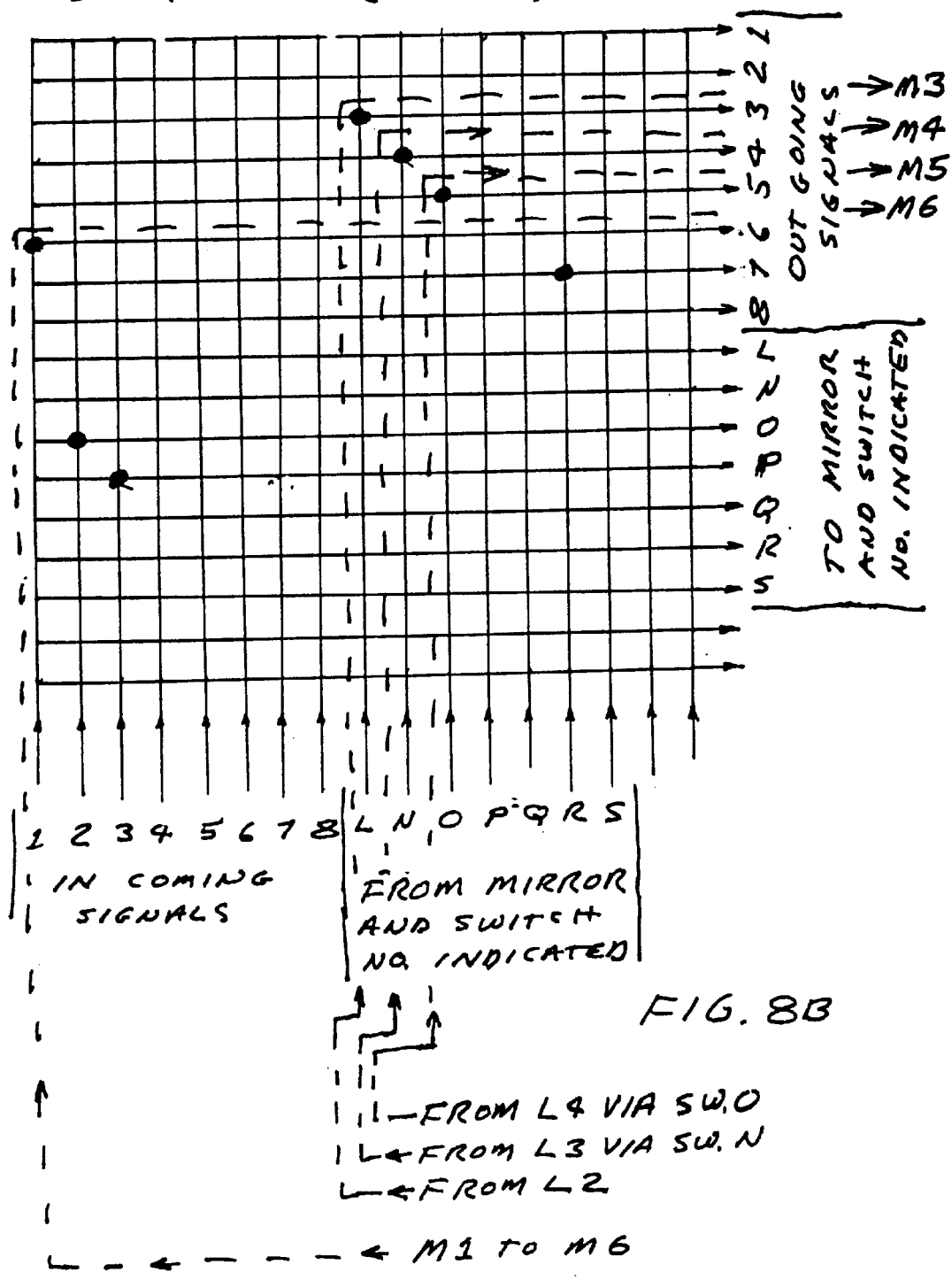
Figure 8C:
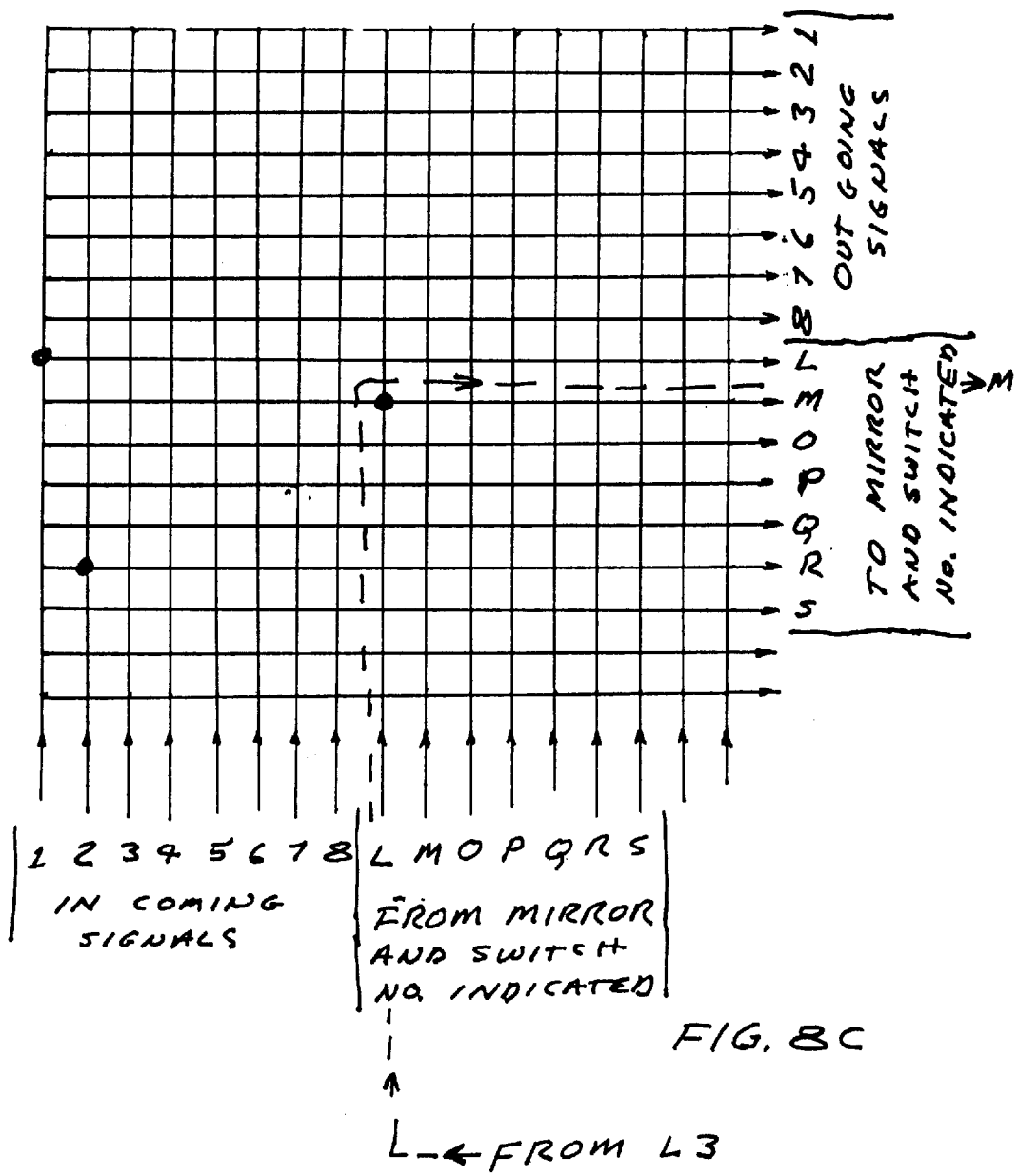
Figure 80:
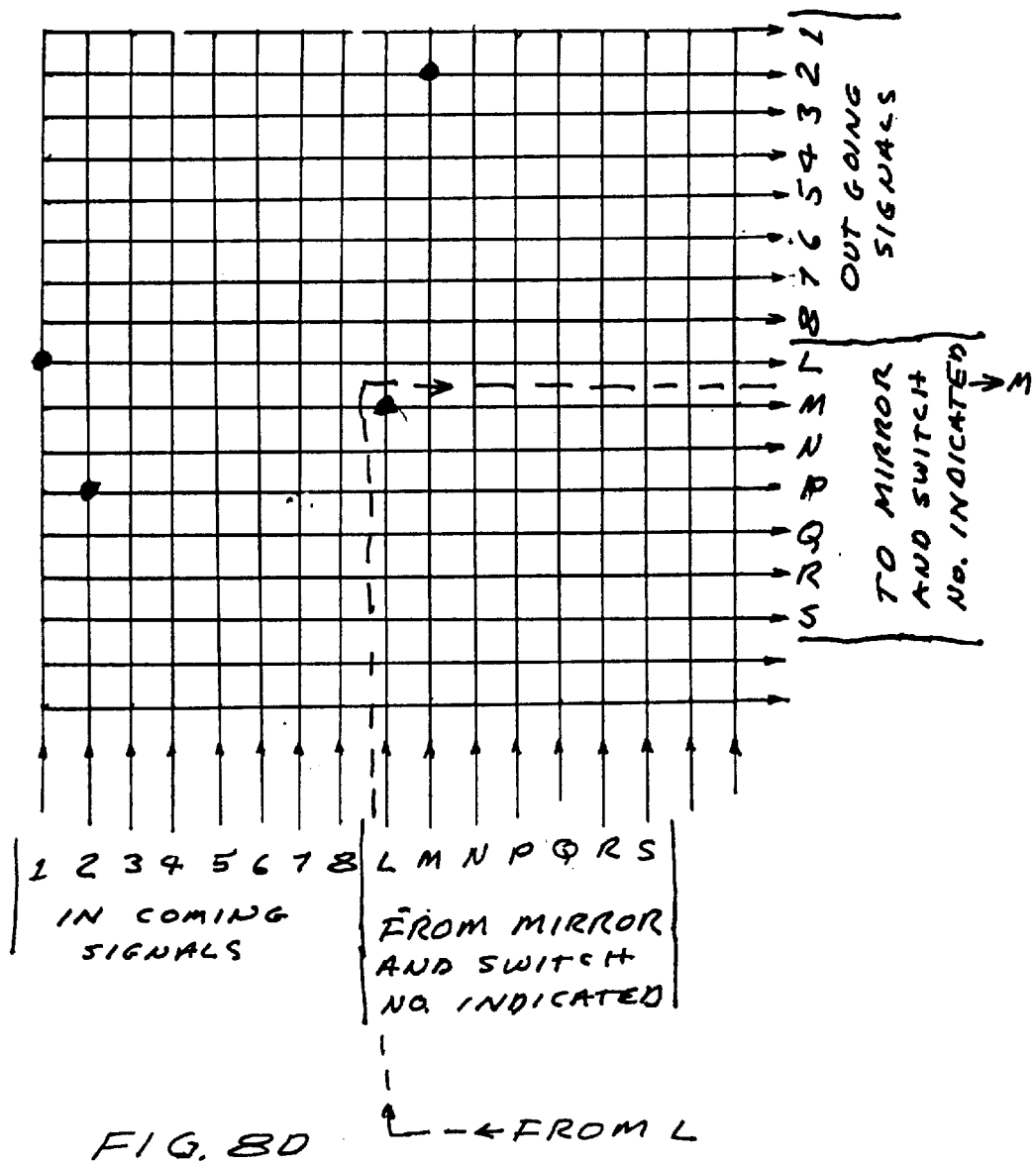
Figure 8E:
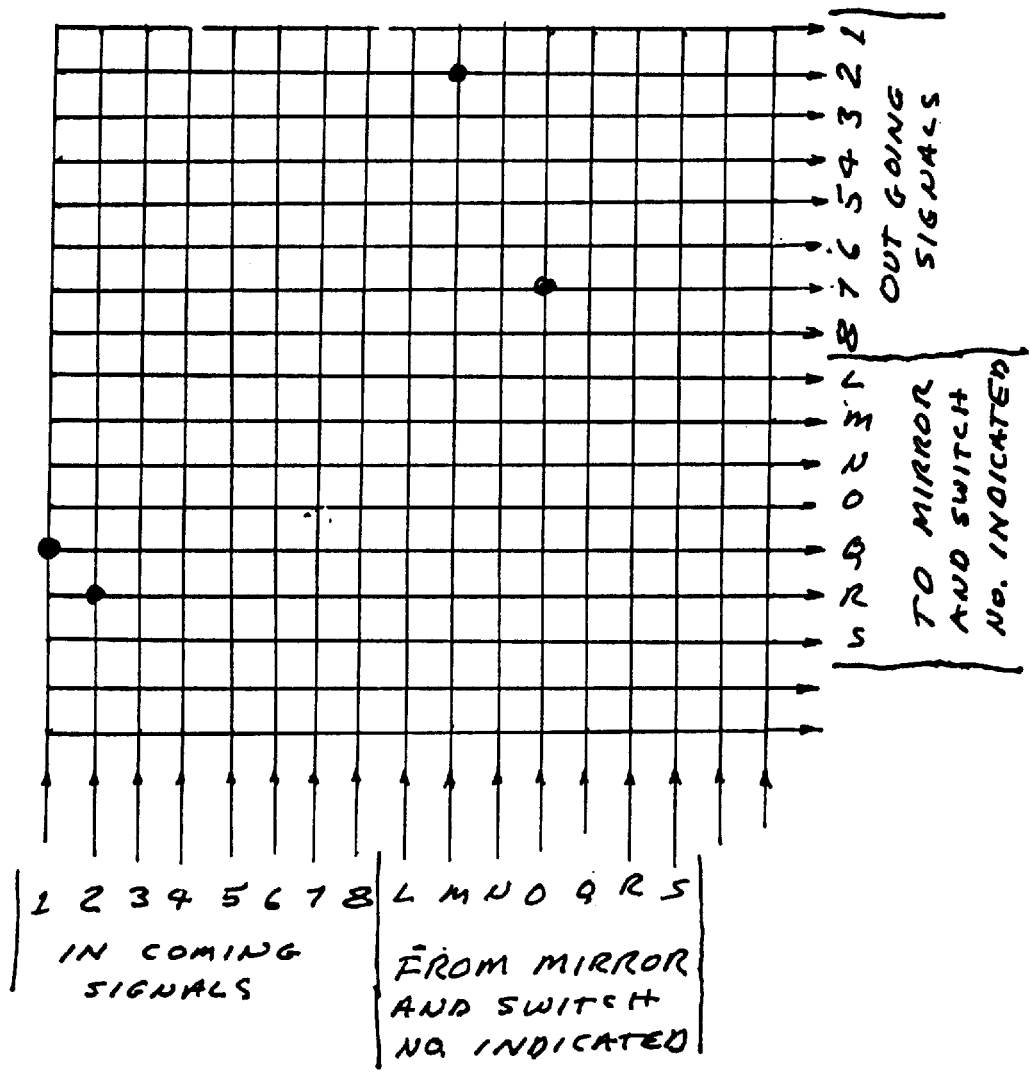
Figure 8F:
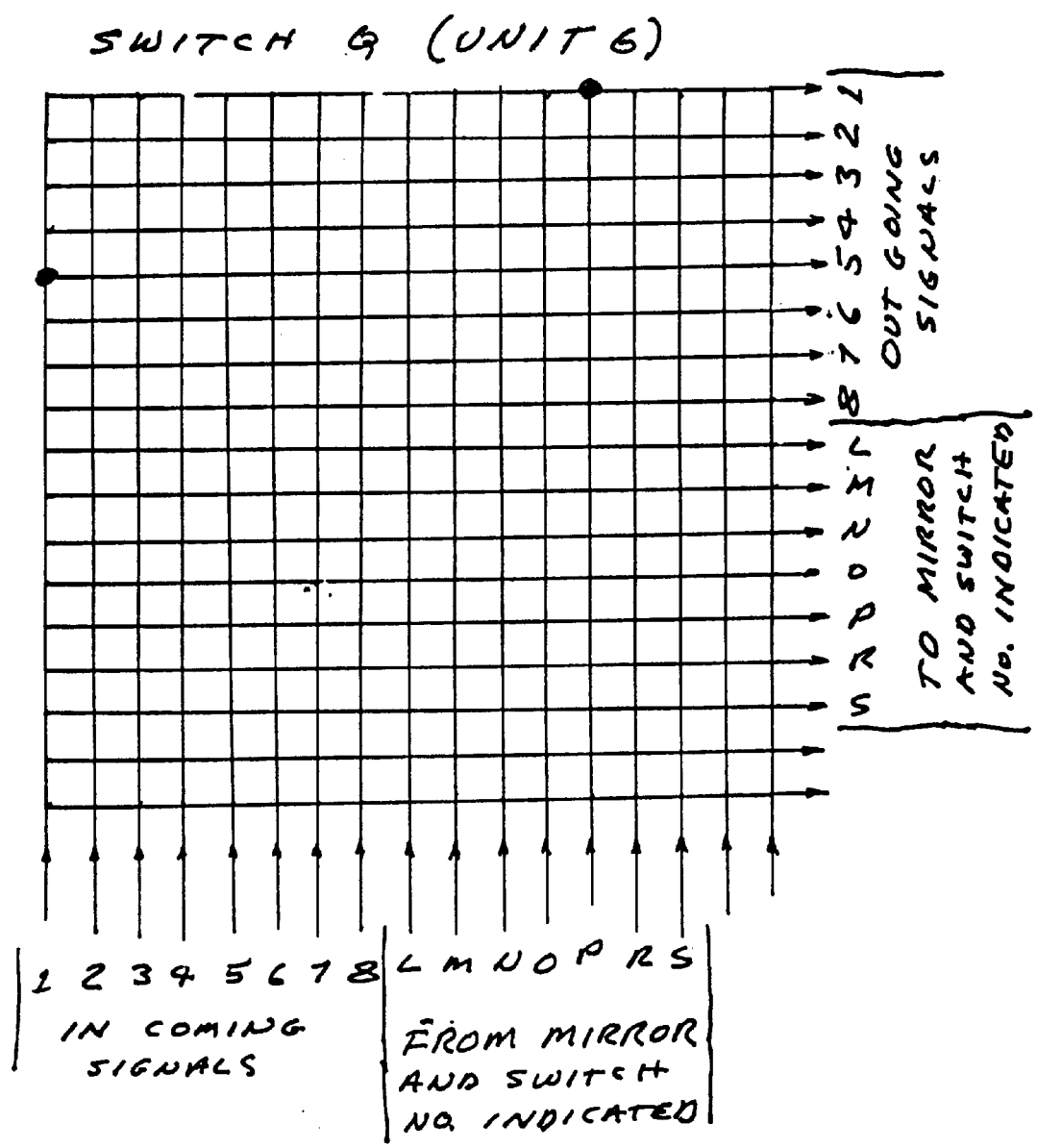
Figure 8G:
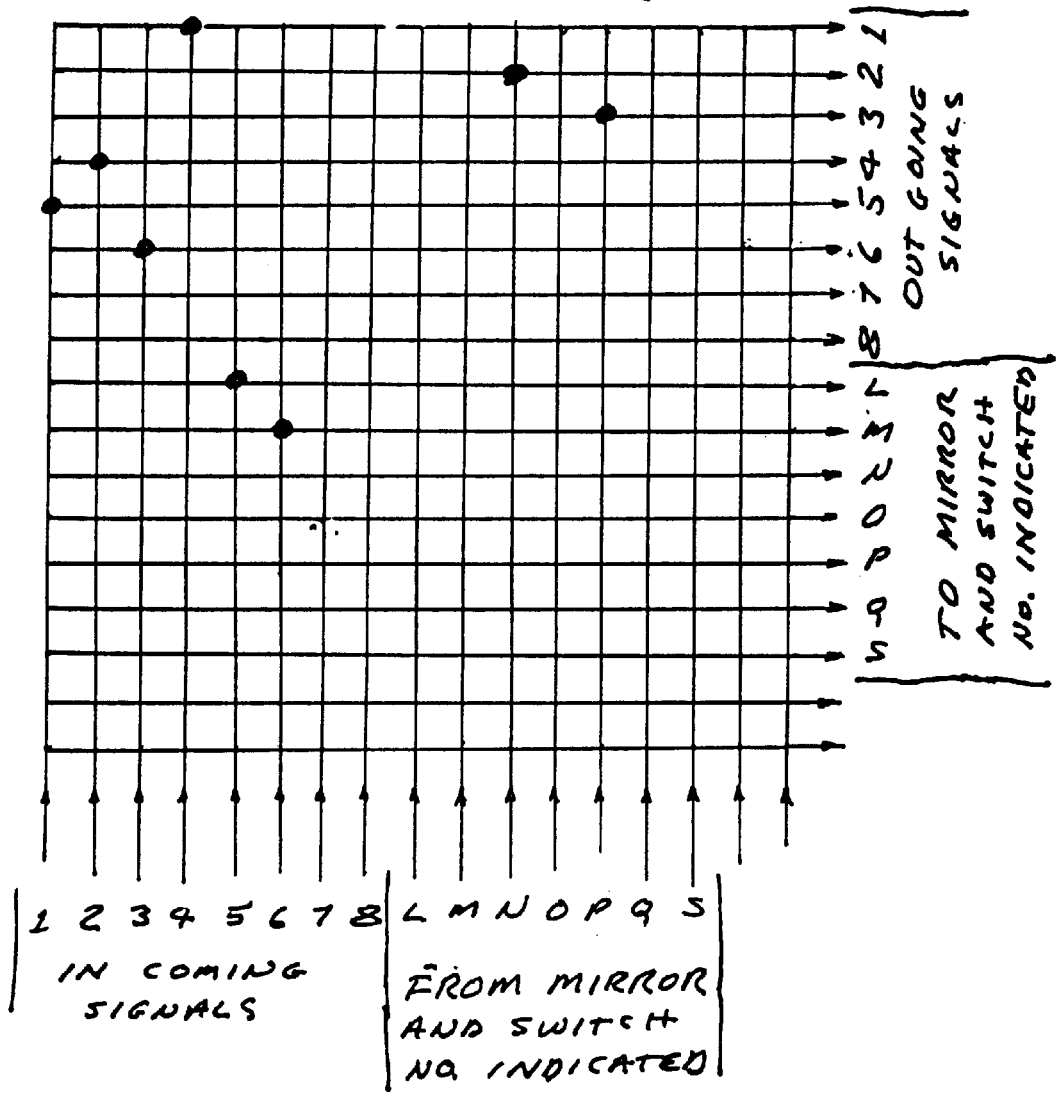
Figure 8H:
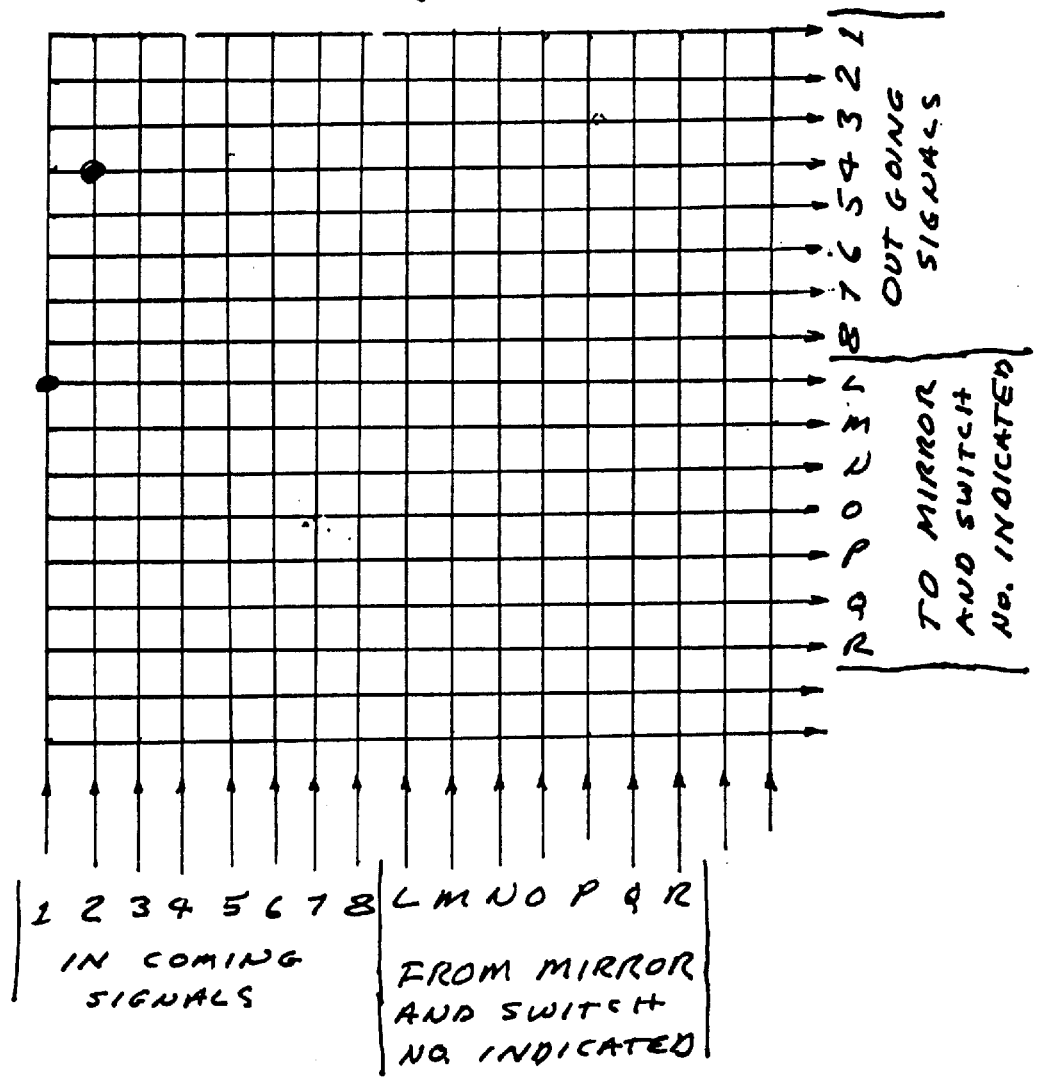

Another approach is to use a curved mirror to simplify the layout as shown in FIG. 4B. Preferably the mirror is a spherical mirror 11 with a focal length equal to the distance between the lenses and the detector. The curved mirror simplifies the alignment of the laser arrays, the lenses and the detector arrays as indicated in FIG. 4B. Tolerances are about the same. FIG. 7 shows a computer simulation of the optical paths using a curved mirror.

Showing Cross Point Connections

FIGS. 8A through 8H are provided as an example to show how a typical set of twenty-two connections can be made with this first preferred embodiment. The 64 lines incoming into the eight cross point switches L through S are designated as 1L, 2L, . . . 8L, 1M, . . . 8S. The output lines are similary designated. The twenty-two connections are the connections listed in Table I below:

TABLE I

| | IN | OUT |
|---|---|---|
| 1 | 1L | 2L |
| 2 | 2L | 3M |
| 3 | 3L | 4M |
| 4 | 4L | 5M |
| 5 | 1M | 6M |
| 6 | 2M | 2O |
| 7 | 3M | 2P |
| 8 | 1N | 1L |
| 9 | 2N | 2R |
| 10 | 1O | 2L |
| 11 | 2O | 7P |
| 12 | 1P | 1Q |
| 13 | 2P | 3R |
| 14 | 1Q | 5L |
| 15 | 1R | 5R |

TABLE I-continued

| | IN | OUT |
|---|---|---|
| 16 | 2R | 4R |
| 17 | 3R | 6R |
| 18 | 4R | 1R |
| 19 | 5R | 6L |
| 20 | 6R | 7M |
| 21 | 1S | 8L |
| 22 | 2S | 4S |

Connection 1 (1L to 2L) is made internal to Switch L by connecting 1L(in) to 2L(out). Connection 1 (2L to 3L) is made by connecting incoming line 2L to laser M in Unit 1 which communicates with detector L in Unit 2 which in turn feeds a signal to incoming line L in to switch M in Unit 2 which is connected to outgoing line 3M to complete the 2L to 3L connection. Connection 3 (3L to 4M) is more complicated since the only optical connection between Switch L in Unit 1 and Switch M in Unit 2 has already been used. The connection is made using laser N in Switch Unit 1, which sends the 3L signal to detector L in Switch N of Unit 3. Switch N then connects the 3L signal to Laser M in Unit 3 which transmits the signal to detector N in Unit 2 where Switch M connects incoming line N to outgoing line 4M to complete the switch of 3L to 4M. Connection 4 is similary made using Switch O to make the connection between 4L and 5M. (Fine lines on FIGS. 8A through 8D track the first of the five connections. The rest of the 22 connections are indicated only by the black dots on FIGS. 8A through 8H that show the crosspoint micro switches which are closed to make the 22 designated connections.

Control Algorithm

Figure 1A:
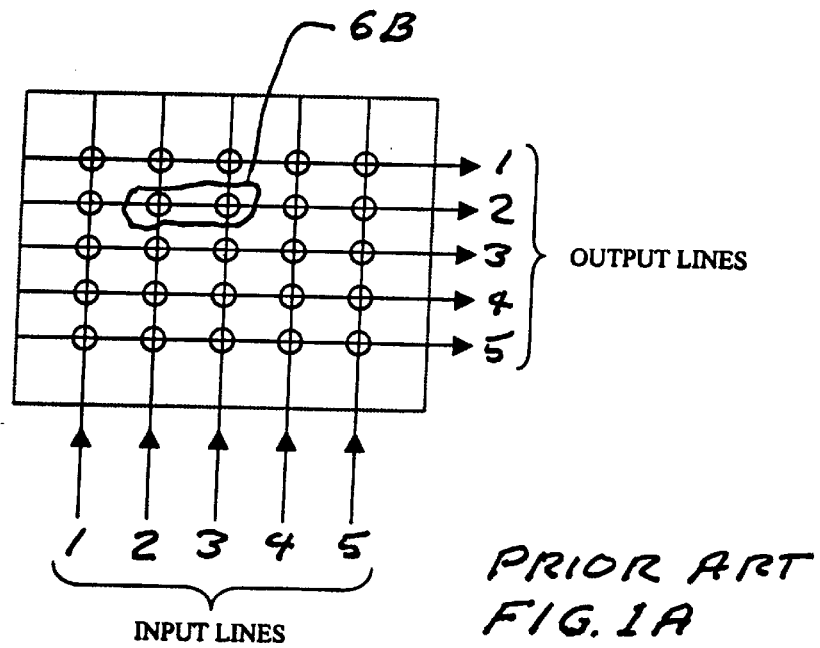
FIGS. 1A and 1B demonstrate the operation of a cross point switch.
Figure 1B:
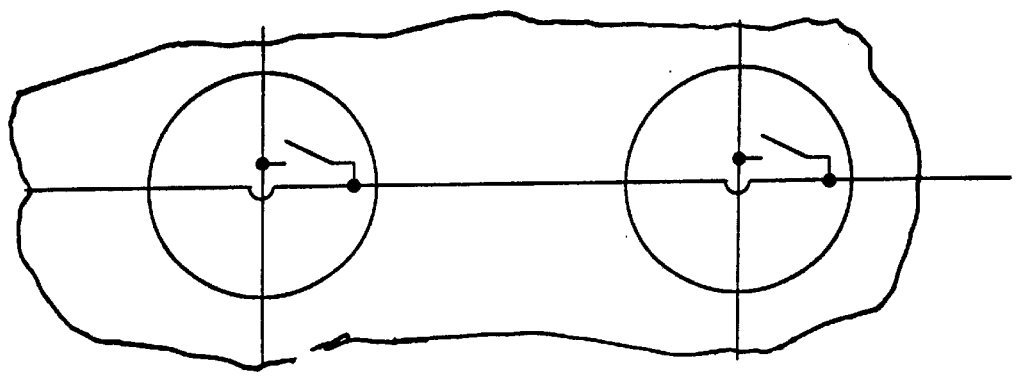

The above examples showing the 22 connections demonstrates that there are a great variety of ways in which a given set of connections may be made. The prior art includes several well-known techniques for programming computers to provide efficient connections utilizing switches of this general type. One well-known technique is the Clos technique where as in this case the switches are larger than binary. The computations are performed off line in a computer, the results of which are sent to the crosspoint switches to set the internal connections from input to output in each optical switch, and as a result set the connections of the system as a whole. A central processor 12 as shown in FIG. 1 controls this 64×64 switch permitting any incoming line to be connected to any outgoing line. Computations are performed offline in the processor 12 and the results are sent to the cross point switches to set the internal connections from input to output in each optical switch and as a result the desired connections are made for the system as a whole.

Other Preferred Embodiments

Figure 9:
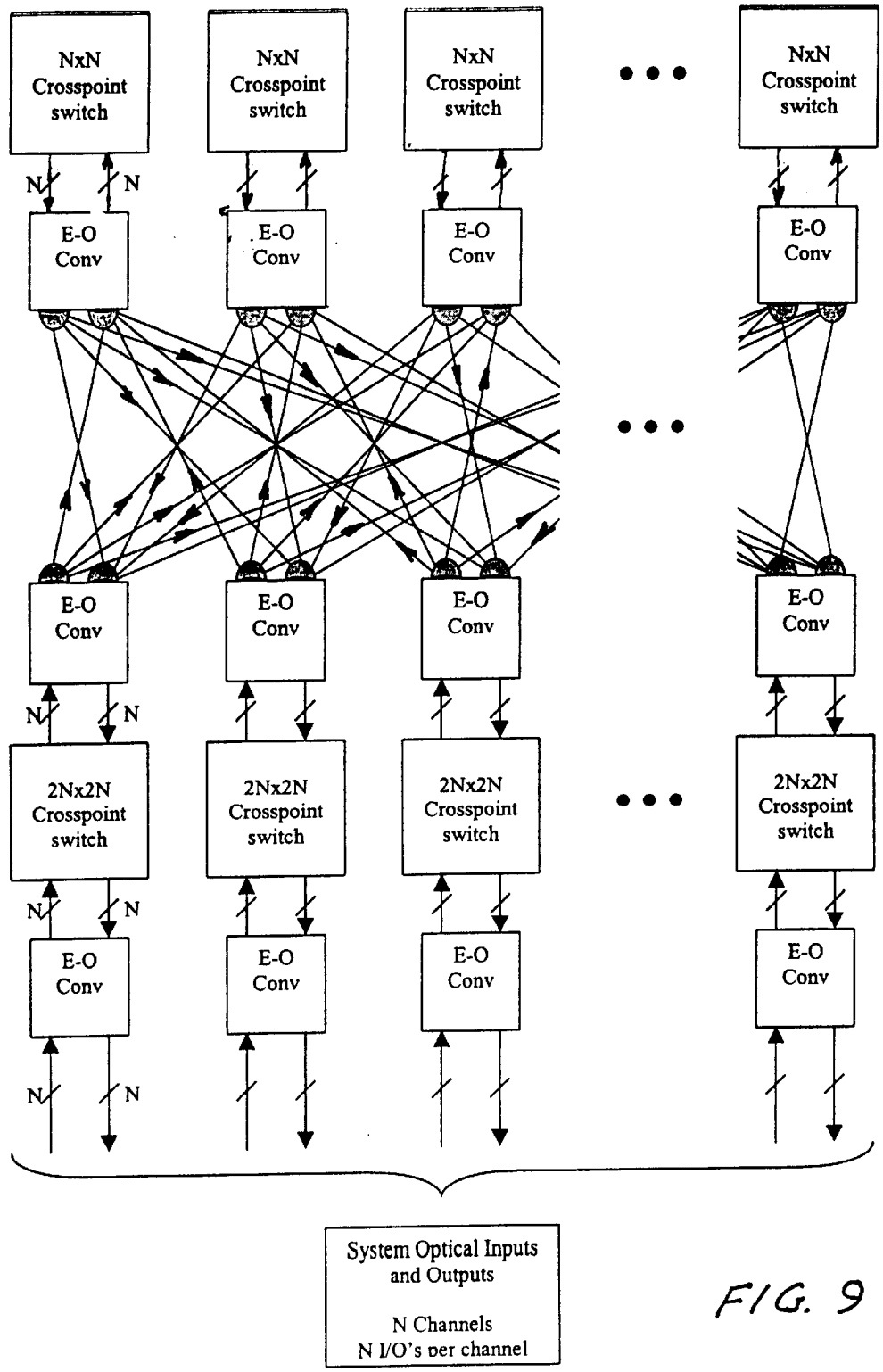
FIG. 9 shows a preferred embodiment of the present invention that does not use a mirror.
Figure 10:
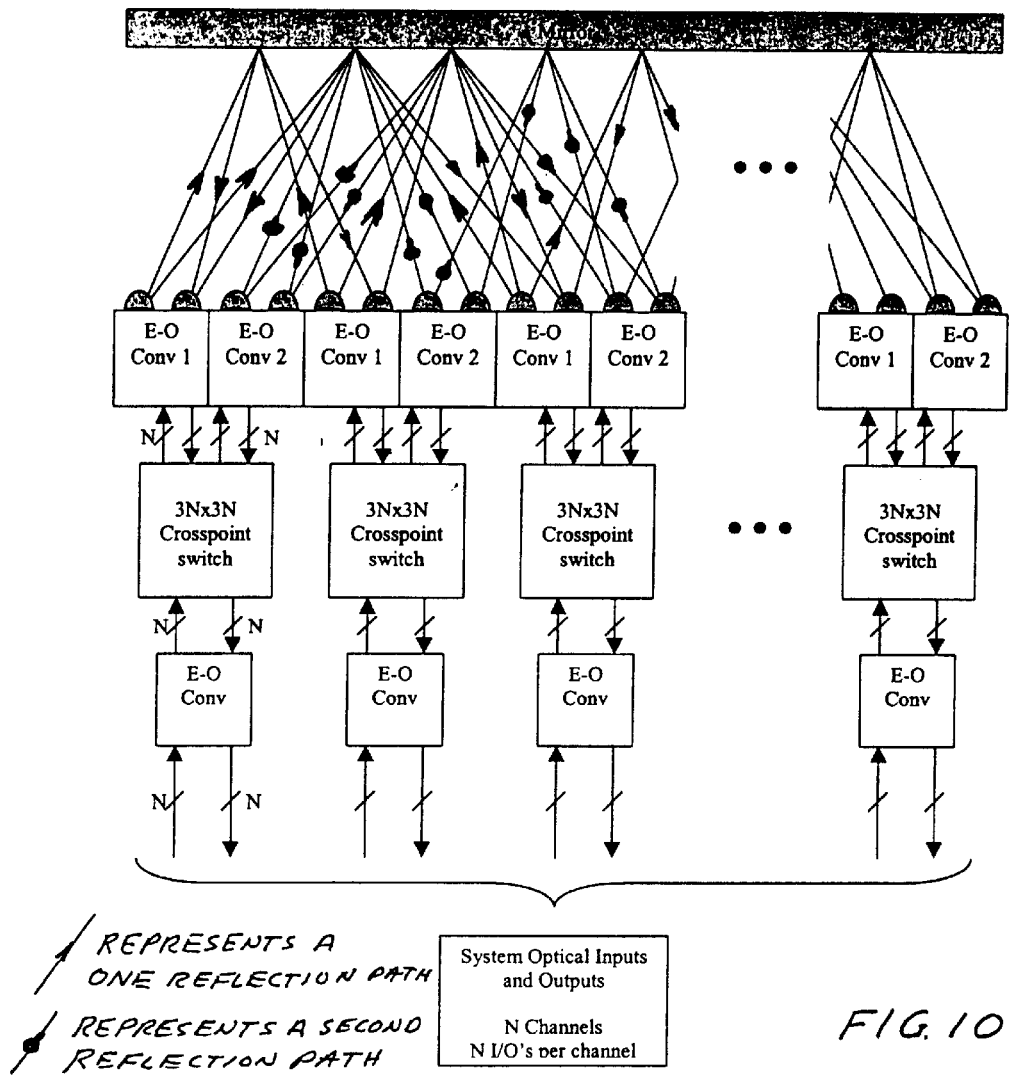
FIG. 10 shows a preferred embodiment providing two reflections from a single mirror.

Two other preferred embodiments of the present invention are shown in FIGS. 9 and 10. Both of these are configurations that can be programmed to utilize Clos control algorithm for providing very efficient use of the switches. (See M. J. Marcus, The Theory of Connecting Networks and Their Complexity, A Review, Proc. IEEE, vol 65, pp 1263–1271, September 1977. Also see C. Clos, "A Study of Non-Blocking Switching Networks," Bell Syst. Tech. Jour., March 1953, pp. 406–424.) The Clos architecture is a way of arranging individual switches to get the benefit of a single big switch. Clos showed in 1952 that the configurations shown in FIGS. 11A and 11B can result in a tremendous reduction in the number of individual switches needed to connect communication lines when the number of lines are large. For example, when the number of lines are 1000, a square array (such as a crosspoint switch) requires 1,000,000 switches for non-blocking. As explained in the Clos paper, a three-stage Clos architecture requires only 186,737 switches and a five-stage Clos network requires only 146,300 switches. Both the FIG. 9 embodiment and the FIG. 10 embodiment can be configured to operate as a three-stage Clos architecture producing in each case a large non-blocking switch.

The FIG. 9 embodiment does not utilize a mirror as does the first preferred embodiment. It does utilize an optical interconnection configuration similar to the first preferred embodiment except in this case each of a number N (which could be eight as before) of individual switch units comprise a 2N×2N crosspoint switch and is connected optically to N N×N crosspoint switches as shown in FIG. 9. All of the crosspoint switches are non-blocking of the type shown in FIGS. 1A and 1B and 8A through H.

The FIG. 10 embodiment utilizes a 3N×3N crosspoint switch and is configured to provide two reflections from the mirror. The paths of the beams from the emitter arrays to the detector arrays are indicated by a standard arrow for the first reflection path and arrows with rounded rear portions for the second reflection path.

Components

The detector arrays are high bandwidth receiver arrays, supplied by companies such as Fermionics and Emcore. The amplifiers (not shown in FIG. 3) consist of transimpedence amplifiers and limiting amplifiers supplied by AMCC (part 7022), Anadigics, Philips, and Maxim. The crosspoint switches are available from Mindspeed, AMCC, Vitesse and Velio. The drivers for driving the emitter arrays available from AMCC (part 7025). The emitter arrays are supplied by JDSU, Cielo, Honeywell, and Emcore. The emitter arrays can either be an array of lasers, or an array or modulators fed by a single laser. The baseline data rate is 2.5 Gbps in this embodiment.

External data ports are on cards that connect additional inputs and outputs of the crosspoint switch to communication system input/output lines. There are nominally the same number of external inputs, external outputs, input lines from the detector array, and output lines to the detector array. The nominal value for this is 8, so that each crosspoint switch has a total of 16 inputs and 16 outputs.

One of the ways to connect these external inputs and outputs is through conventional fiber optic transceivers and connectors, 16 on each card. Another way is through conventional transceivers and parallel fiber optic cable connectors, configured as 8 fibers in a ribbon. In this case there is one input ribbon connector and one output ribbon connector.

Readers will recognize that the present invention can be used to switch electronic lines directly in which case the electronic to optics device D as shown in FIG. 3 would not be needed.

Other Embodiments

Persons skilled in the art will recognize that the present invention may be practiced using many embodiments other than the ones described above. For example, Many other size switches could be developed using the above-described techniques. In addition to the three-stage Clos architects, many other networks could be used including the five-stage Clos network. Also, networks other than Clos could be used. In many cases cost or other considerations will result in architects other than non-blocking being preferred. The crosspoint switches can be upgraded with other multi-switch switch configurations to enable switching of individual sub channels within each 2.5 Gbps data line. In one embodiment we use, for example, a Velio VC-2002 grooming switch followed by a VC-3003 crosspoint switch followed by another VC-2002 grooming switch. These chips enable switching of 72 channels, each at OC-48 (2.5 Gbps), at the STS-1 subchannel level (50 Mbps). This allows subchannel switching. Obviously this chip as well as many other available can handle many more channels than first embodiment described above. This 3-chip switch is actually a 3-layer Clos switch itself, so the whole system would become a 5-layer Clos switch. The emitter arrays described above operate at 1300 nm (preferred) although 850 and 1550 are good choices. The system described in detail above uses 8 element laser arrays, although other laser arrays or modulator arrays driven by lasers can be used. The system above uses 8 element detector arrays but many other detector arrays are available. The ones described operate at 2.5 Gbit/sec. Other speeds are of course available at various prices and will be preferred to meet specific operation and cost requirements. The effect of the grooming switch is to rearrange the order of the 50 Mbps subchannels in the 2.5 Gbps channel so that each particular subchannel can be switched to any channel on any board. Many multi-switch switches other than crosspoint switches may be used instead of the crosspoint switch. Other possible switches are optical switches, ATM switches, IP routers, mutiprotocol switches. The emitter arrays may be lasers, modulators as indicated above, and also light emitting diodes and other multi-element arrays. The transmitter and receiver lenses can be separate as described above or the transmitters and receivers could share the same lens. The mirror could be flat or curved as described above or it could be faceted or modified in other ways to simplify alignment. The transmitters and receivers could be arranged in a one-dimensional configuration or in a two dimensional configuration. Therefore, the reader should understand that the scope of the invention should be determined not by the above specific embodiment, but by the claims and their legal equivalents.

We claim:

1. A large electronic-optic interconnect switch for connecting communication lines, said switch comprising:
   A) a plurality of switch units, each switch unit comprising:
      1) a processor controlled electronic multi-switch switch comprising a plurality of micro-switches, re-configurable upon computer command and having a plurality of electronic input ports and a plurality of output ports,
      2) a plurality of input communication lines connected to a portion of said input ports,
      3) a plurality of output communication lines connected to a portion of said output ports,
      4) an optical emitter array in communication with a portion of said output ports, said array comprising a plurality of optical emitters for emitting light beams for carrying optical communication signals, and
      5) an optical detector array unit comprising a plurality of detectors for detecting optical communication signals in light beams and converting the optical signals to electronic signals, said detector array unit being configured to provide said electronic signals to a portion of said input ports;

B) a free space optical interconnection configuration for directing light beams from said plurality of emitters in said emitter arrays in said plurality of switch units to said plurality of detectors in said detector array in said plurality of switch units; and C) a computer processor programmed with an algorithm for configuring said micro-switches to produce desired connections among said input communication lines and said output communication lines.

2. An interconnect switch as in claim 1 wherein each multi-switch in said plurality of switch units is a cross point switch.

3. An interconnect switch as in claim 1 wherein said interconnect switch is configured to switch fiber optic lines.

4. An interconnect switch as in claim 3 wherein each of said switch unit comprises an optics to electronic conversion array for converting optical signals to electronic signals.

5. An interconnect switch as in claim 1 wherein said optical interconnection configuration comprises a plurality of emitter lenses each lens in said plurality of emitter lenses defining a focal length and positioned said focal length away from each emitter array and a plurality of detector lenses each lens in said plurality of detector lenses defining a focal length and positioned said focal length away from each detector array.

6. An interconnect switch as in claim 1 wherein said optical interconnection configuration comprises a mirror positioned to reflect light beams from emitters in said emitter arrays to detectors in said detector arrays.

7. An interconnect switch as in claim 6 wherein said mirror is a curved mirror.

8. An interconnect switch as in claim 7 wherein said curved mirror is configured to permit said emitter arrays and said detector arrays to be aligned symmetrically.

9. An interconnect switch as in claim 7 wherein said curved mirror is a spherical mirror.

10. An interconnect switch as in claim 1 wherein said optical interconnection configuration comprises a mirror positioned to reflect light beams from each emitters in said emitter arrays to a single separate detector in said detector arrays.

11. An interconnect switch as in claim 1 wherein said algorithm is a Clos algorithm.

12. An interconnect switch as in claim 1 wherein each of said emitter arrays are laser arrays.

13. An interconnect switch as in claim 1 wherein each of said emitter arrays are an array of laser modulators.

14. An interconnect switch as in claim 1 wherein each of said switch units also comprises a driver array for driving said emitters in said optical array.

15. An interconnect switch as in claim 1 wherein each of said optical detector units comprises an amplifier array for amplifying electronic signals produced by said array of optical detectors, said amplifier array configured to provide amplified electronic signals to a portion of said input ports.

16. An interconnect switch as in claim 6 and further comprising at least one additional mirror, said mirror and said at least one additional mirror being configured to provide a compact optical path reducing said interconnect switch size.

17. An interconnect switch as in claim 1 wherein said interconnect switch is configured in a standard Clos architecture.

18. An interconnect switch as in claim 1 wherein said optical interconnection configuration comprises a plurality of lenses each lens in said plurality of lenses defining a focal length and positioned said focal length away from an emitter array and a detector array and configured to direct light away from said emitter in a desired direction and to focus light on detectors in said detector array.

* * * * *